United States Patent [19]
Morohashi et al.

[11] Patent Number: 5,273,080
[45] Date of Patent: Dec. 28, 1993

[54] TUBULAR MULTILAYER WOVEN FABRIC AND METHOD FOR WEAVING SAME

[75] Inventors: Kazuo Morohashi; Hiroshi Matsuyama, both of Yokohama, Japan

[73] Assignee: Nippon Oil Co., Ltd., Tokyo, Japan

[21] Appl. No.: 776,773

[22] Filed: Oct. 17, 1991

[30] Foreign Application Priority Data

Oct. 18, 1990 [JP] Japan .................. 2-281049

[51] Int. Cl.⁵ .................. D03D 11/00; D03D 3/02
[52] U.S. Cl. .................. 139/388; 139/18; 139/408; 138/124
[58] Field of Search .......... 138/124, 125, 126; 139/11, 457, 388, 18, 408, DIG. 1, 192

[56] References Cited

U.S. PATENT DOCUMENTS

| | | | |
|---|---|---|---|
| 161,272 | 3/1875 | Reed | 138/124 X |
| 173,615 | 2/1876 | Gillespie | 138/124 X |
| 299,017 | 5/1884 | Schenck et al. | 138/124 X |
| 610,463 | 9/1898 | Stowe | 138/126 X |
| 937,021 | 10/1909 | Cobb | 138/126 |
| 4,174,739 | 11/1979 | Rasero et al. | 139/388 |

FOREIGN PATENT DOCUMENTS 52-39473 10/1977 Japan .

*Primary Examiner*—Andrew M. Falik
*Attorney, Agent, or Firm*—Stevens, Davis, Miller & Mosher

[57] ABSTRACT

A tubular multilayer woven fabric composed of at least two layers of a plurality of axial yarns, a circumferential yarn arranged between each layer without being interlaced with the axial yarns, and an interlacing yarn interlacing the axial yarns in different layers of the axial yarn. This woven fabric can be manufactured by inserting a yarn into shedding spaces by moving a shuttle along a straight line, traversing in a lateral direction, moving back along another straight line, and further traversing in a lateral direction back to the original position.

10 Claims, 7 Drawing Sheets

TUBULAR MULTILAYER WOVEN FABRIC AND METHOD FOR WEAVING SAME

BACKGROUND OF THE INVENTION (1) The present invention relates to a tubular multilayer woven fabric, i.e., a three-dimensional multilayer woven fabric having a tubular cross section and formed by arranging a non-interlaced circumferential yarn on an intermediate position thereof, and a method for manufacturing the tubular multilayer woven fabric.

(2) Description of the Related Art

Various three-dimensional woven fabrics have been disclosed; for example, Japanese Examined Patent Publication (Kokoku) No. 52-39473 discloses a three-dimensional multilayer woven fabric formed by arranging a plurality of warp yarns and a plurality of weft yarns in a horizontal direction and a vertical direction and binding the warp yarns and the weft yarns to each other by a plurality of binding yarns to form one body. Further a tubular three-dimensional woven fabric having one layer formed by arranging a plurality of yarns along an axial direction of a mandrel, on a circumferential surface of the mandrel, and interlacing or weaving a yarn in a direction perpendicular to the axial yarns into the axial yarns, is known.

The three-dimensional multilayer woven fabric obtained by the method disclosed in Japanese Examined Patent Publication (Kokoku) No. 52-39473 is only a woven fabric having a rectangular cross section, and although a tubular three-dimensional woven fabric can be obtained by the latter method, the obtained woven fabric has one layer and thus a tubular woven fabric having a thick thickness cannot be obtained by this method.

A fiber reinforced tubular molded piece obtained by using a woven fabric of a glass fiber, a carbon fiber or the like as a reinforcing material of a resin or the like is known, and the following typical manufacturing methods for the fiber reinforced tubular molded piece, e.g., a fiber reinforced pipe, are known but have the following disadvantages:

1. A method of weaving a flat woven fabric of the glass fiber, the carbon fiber or the like, and then rolling the obtained woven fabric to form a circular shape when making a reinforcing body.

Since the reinforcing body having the circular shape manufactured by this method has a join line along an axial direction of the reinforcing body, a problem arises in that a strength against a stress applied in a circumferential direction of the tube becomes irregular and thus the molding ability of this method is low;

2. A method of weaving a tape-like woven fabric of the glass fiber, the carbon fiber or the like, and winding the tape-like woven fabric in a spiral state on a support to make a reinforcing body.

A molding ability in a process of this method is relatively simple compared with that of the above method 1, but a spirally joining line extends in an axial direction in a molded piece obtained by this method and thus a problem arises in that a strength against a stress applied in an axial direction of the tube is not sufficiently high; and 3. A method of weaving a tubular woven fabric of a glass fiber, a carbon fiber, or the like to make a one layer tubular woven fabric, and piling at least two layer tubular woven fabrics on each other to make a reinforcing body.

When this reinforcing body is made, if the tubular woven fabric having the same number of yarns per unit length in an axial yarn and an circumferential yarn are manufactured, a pipe having the same strength in the axial direction and the circumferential direction can be obtained.

It is well known that, when a pressure is applied to a pipe from an inside or an outside, a stress generated in a circumferential direction becomes twice as much as a stress generated in an axial direction. Accordingly, if a relatively large strength is not required for the circumferential strength, it is possible to make the number of yarns per unit length in the axial direction approximately half the number of yarns per unit length in the circumferential direction. When it is necessary to improve the circumferential strength, however a problem arises in that, since the circumferential yarn must be interlaced with the axial yarns, there is a maximum limit to the number of yarns per unit length of the circumferential yarn. Further, the circumferential yarn in the tubular woven fabric has a wave-like shape due to being woven with the axial yarn, and strain in the circumferential direction is generated in a tube by a curve-like deformation of the circumferential yarn, and thus it is impossible to attain a high reinforcing effect. For the above reason, when it is intended to increase the strength in the circumferential direction of the tubular woven fabric, usually an additional reinforcing filament is wound on a surface of the tubular woven fabric, but this procedure is cumbersome and thus a problem arise in that the productivity of this type tubular woven fabric is lowered.

SUMMARY OF THE INVENTION

A primary object of the present invention is to provide a tubular multilayer woven fabric having a sufficient strength agaist a stress applied in the circumferential direction.

A second object of the present invention is to provide a method for manufacturing the tubular multilayer woven fabric having a sufficient strength against a stress applied in the circumferential direction.

In accordance with the present invention, the primary object is attained by a tubular multilayer woven fabric composed of at least two layers comprised of a plurality of yarns arranged in a substantially circular shape along a direction parallel to an axis of the tubular multilayer woven fabric, respectively, each layer of the at least two layers being arranged from an inside to an outside of the tubular multilayer woven fabric; a circumferential yarn arranged between the adjacent layers and extending spirally in a circumferential direction of the tubular multilayer woven fabric; and at least a yarn extending spirally in the circumferential direction of the tubular multilayer woven fabric and interlacing the yarns constituting the one layer with the yarns constituting the other layer.

It is preferable that the at least two layers are a woven fabric formed by arranging two weft yarns interlacing each axial yarn constituting the individual layer, respectively.

Further two or three layers constituted by the yarns arranged in the direction parallel to the axis of the tubular multilayer woven fabric and, arranged coaxially, can be used.

The number of yarns interlacing the yarns constituting the one layer with the yarns constituting the another layer each other may be one or two, but when two interlacing yarns are used, the connection between the layers is firmer.

It is preferable that a yarn of a glass fiber or a yarn of a carbon fiber is used as the yarn constituting the tubular multilayer woven fabric in accordance with the present invention.

In accordance with the present invention, the second object is attained by a method comprising the following steps (a) to (f)

a) a step of supplying at least two layers comprised of a plurality of yarns along a circumferential surface of a core member having a circular cross sectional shape such that each layer is coaxially arranged, b) a step of separating the yarns of one layer from the yarns of an adjacent layer to make a first shedding space, c) a step of picking a yarn into the first shedding space made by the step (b), d) a step of separating at least a part of the yarns in one layer from the other yarn, including at least yarns in the other layer, to make a second shedding space, e) a step of picking a yarn into the second shedding space made by the step (d), and f) a step of repeating the steps from the step (b) to the step (f) until a tubular multilayer woven fabric having a predetermined length is obtained.

It is preferable that the step (d) and the step (e) are applied twice in a state such that a relative arrangement of the set of the yarns and the other set of yarns, are mutually reversed in the step (c), to make the connection between the layers firmer.

Also, preferably the at least two layers are made as a woven fabric, and a step (g) of separating a set of the yarns of one layer from another set of remaining yarns of the same layer is carried out, to make third shedding space, and a step (h) of picking a weft yarn into the third shedding space are added, and the step (g) and step (h) are applied twice in a state such that a relative arrangement of the set of the yarns and another set of the yarns in the same layer is mutually reversed.

DESCRIPTION OF THE PREFERRED EMBODIMENTS

The present invention will be described hereinafter in connection with the accompanying drawings showing embodiments of the present invention.

Figure 1:
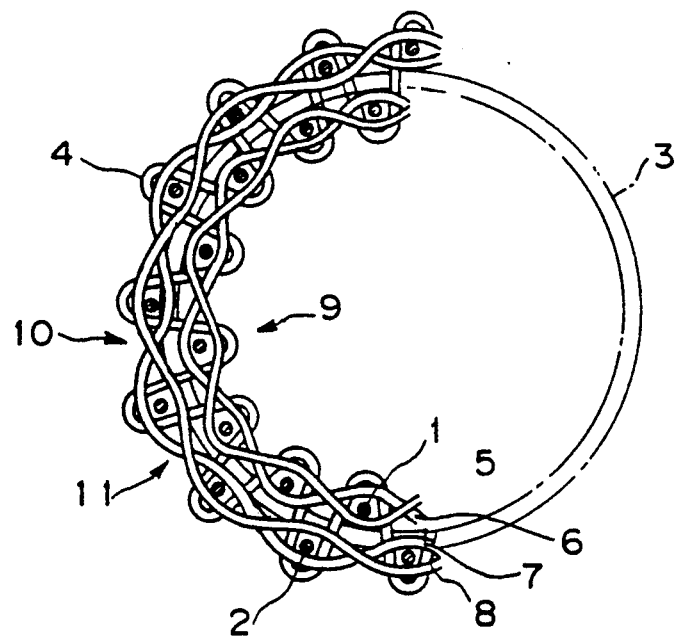
FIG. 1 is a partial cross sectional view of a first embodiment of a tubular multilayer woven fabric in accordance with the present invention.

A first embodiment of a tubular multilayer woven fabric in accordance with the present invention is shown in FIG. 1.

As illustrated in FIG. 1, a plurality of yarns 1 and 2 are arranged in a substantially circular shape along a direction parallel to an axis of a tubular multilayer woven fabric 11.

The yarns 1 are arranged in an inner side of the tubular multilayer woven fabric 11, (referred as an inner axial yarn 1 hereinafter) and the yarns 2 are arranged in an outer side of the tubular multilayer woven fabric 11, (referred as an outer-axial yarn 2 hereinafter). The number of inner axial yarns 1 is the same as that of the outer axial yarns 2. The inner axial yarns 1 are interlaced with weft yarns 5 and 6 to make a woven fabric having a plain weave, whereby an inner layer 9 is formed by this woven fabric. The outer axial yarns 2 are interlaced with weft yarns 7 and 8 to make a woven fabric having a plain weave, whereby an outer layer 10 is formed by this woven fabric. Note, although the inner layer 9 and the outer layer 10 are made by using the weft yarns in the first embodiment, as described in detail hereafter, the inner layer 9 and the outer layer 10 may be constituted only by the axial yarns.

A circumferential yarn 3 is arranged in a non-interlaced manner between the inner layer 9 and the outer layer 10 without restraint, and extended spirally in a circumferential direction of the tubular multilayer woven fabric 11.

A yarn 4 is a yarn interlacing the inner axial yarn 1 to the outer axial yarn 2 to make the inner layer 9, the circumferential yarn 3, and the outer layer 10 to one body. Namely, the yarn 4 extends partially in a radial direction from an outside of the outer axial yarn 2 to an inside of the inner axial yarn 1, turns around the inner axial yarn 1, and then extends in the radial direction from the inside of the inner axial yarn 1 to the outside of the outer axial yarn 2, and as a whole, the yarn 4 extends spirally in the circumferential direction of the tubular multilayer woven fabric.

Figure 2A:
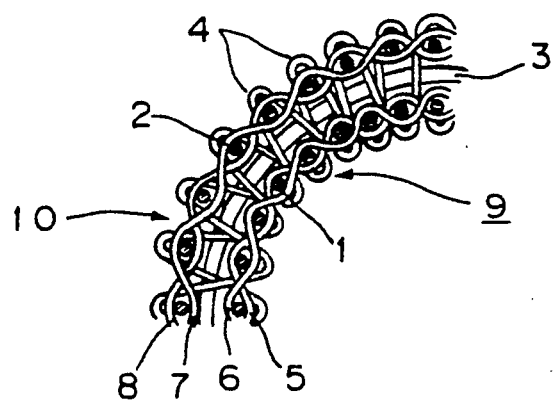
FIG. 2A is a partial cross sectional view of a second embodiment of the tubular multilayer woven fabric in accordance with the present invention.
Figure 2B:
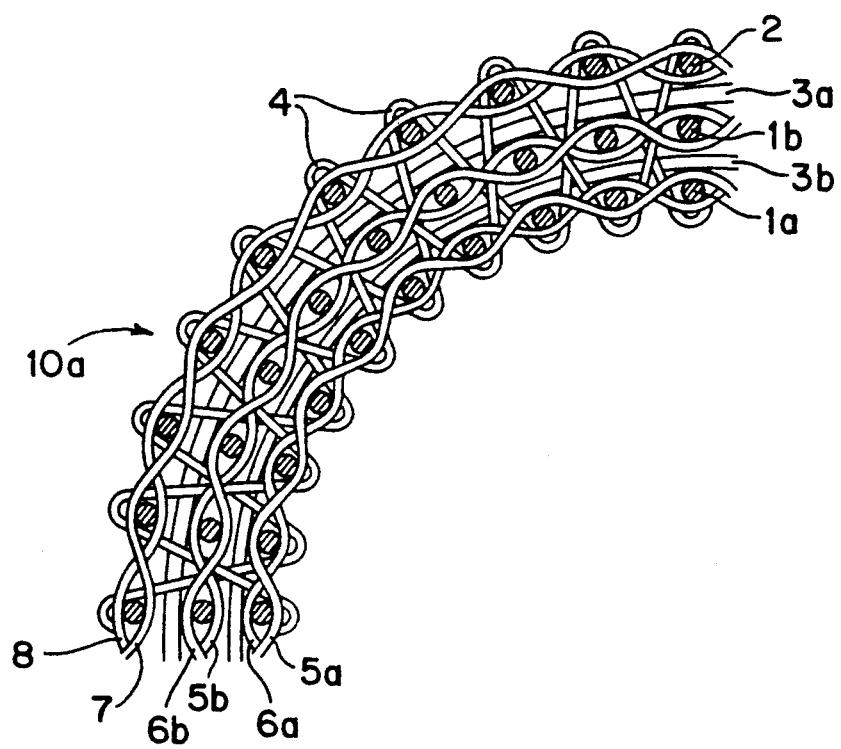
FIG. 2B is a view similar to FIG. 2A but showing a fourth embodiment having three layers.

In the first embodiment, the interlacing yarns 4 interlaces all of the inner axial yarns 1 in the inner layer 9 with all of the outer axial yarns 2 in the outer layer 10, but since all the inner axial yarns 1 are restrained by the weft yarns 5 and 6, and all of the outer axial yarns 2 are restrained by the weft yarns 7 and 8, it is unnecessary to interlace all of the inner axial yarn 1 with all of the outer axial yarn 2 by the interlacing yarn 4, to make the inner layer 9 and the outer layer 10 to one body. Accordingly, it is possible to arrange the interlacing yarn 4 in such a manner that the interlacing yarn 4 interlaces every two or three yarns of the inner axial yarns 1 with every two or three yarns of the outer axial yarns 2. In a second embodiment of the tubular multilayer woven fabric in accordance with the present invention illustrated in FIG. 2, the interlacing yarn 4 interlaces every two yarns of the inner axial yarns 1 with every two yarns of the outer axial yarns 2.

It is apparent that the circumferential yarn 3 is restrained at a side face thereof with the inner layer 9, the outer layer 10 and the interlacing yarn 4, but the circumferential yarn 3 extends directly in a circumferential direction thereof without receiving restriction by the other materials such as the interlacing yarn 4 or the like. Accordingly, a stress in a circumferential direction applied to a pipe made by using the tubular multilayer woven fabric in accordance with the present invention acts directly on the circumferential yarn as a stretching stress, and therefore it is possible to provide a sufficient strength against the circumferential stress applied to the pipe by suitably selecting the circumferential yarn.

A method for manufacturing the tubular multilayer woven fabric will be described hereinafter in connection with FIGS. 3 to 8 showing the method of manufacturing the tubular multilayer woven fabric illustrated in FIG. 1.

Figure 3:
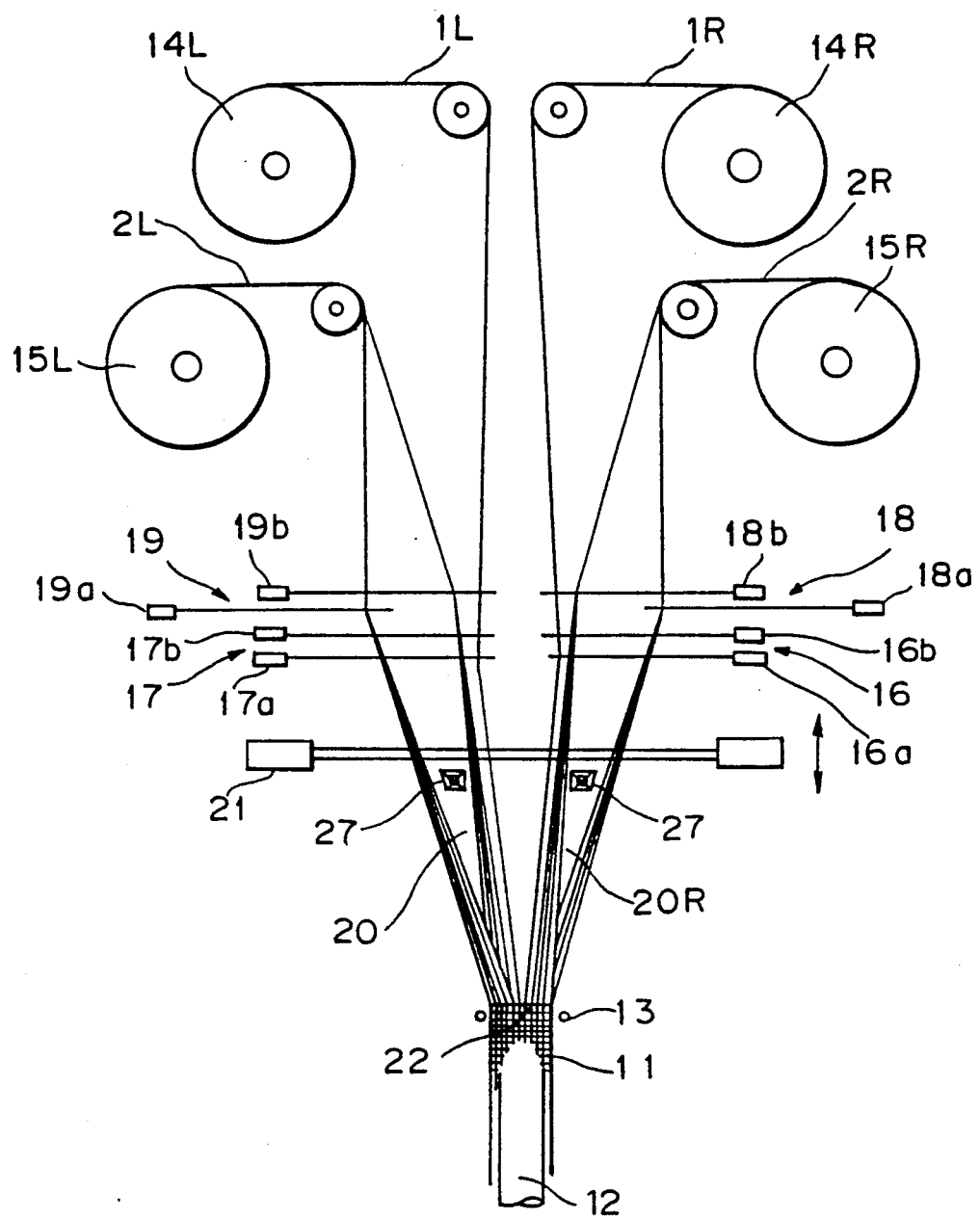
FIG. 3 is a schematic side view illustrating a weaving mechanism in an example of a loom used for weaving the tubular multilayer woven fabric in accordance with the present invention.

An example of a loom used for weaving the tubular multilayer woven fabric in accordance with the present invention is illustrated in FIG. 3. As shown in FIG. 3, the tubular multilayer woven fabric 11 is woven between a mandrel 12 defining an inner diameter of the woven fabric 11 and a guide ring 13 defining an outer diameter of the woven fabric 11. The numerals 14L and 14R denote bobbins supplying an inner axial yarn 1L and an inner axial yarn 1R, respectively, and the numerals 15R and 15L denote bobbins supplying an outer axial yarn 2L and an outer axial yarn 2R, respectively. The inter-axial yarns 1L, 1R, 2L and 2R are separated into two groups along straight lines parallel to a diameter of the ring 13. Note, although each yarn is illustrated as the axial yarns 1L, 1R, 2L and 2R in FIG. 3, the axial yarns 1L, 1R, 2L and 2R are in practice composed of a plurality of axial yarns, respectively, and a number of the axial yarns 1L and 1R is half of a number of the axial yarns constituting the inner layer 9 and a number of the axial yarns 2L and 2R is half of a number of the axial yarns constituting the outer layer 10.

Four shedding devices 16 to 19 including two set of healds are provided for the axial yarns 1L, 1R, 2L and 2R. Namely a shedding device 16 including healds 16a and 16b is provided for the inner axial yarns 1R shown at the right of FIG. 3, a shedding device 17 including healds 17a and 17b is provided for the inner axial yarns 1L shown at the left of FIG. 3, a shedding device 18 including healds 18a and 18b is provided for the outer axial yarns 2R shown at the right of FIG. 3, and a shedding device 19 including healds 19a and 19b is provided for the outer axial yarns 2L shown at the left of FIG. 3.

Each heald can be reciprocally moved along a horizontal line in FIG. 3, under the predetermined weaving plan to provide the axial yarns with required shedding space. Therefore, as described in detail in connection with FIGS. 5 to 8 hereinafter, weft yarns 5 and 6, 7 and 8 can be inserted into a corresponding shedding space prepared by separating the two groups of each axial yarn 1L, 1R, 2L and 2R such that the two groups are spaced from each other or such that the two groups are crossed with each other and are spaced from each other. FIG. 3 shows a state wherein the outer axial yarns 2L and 2R are separated into two groups, to form the shedding space for the weft yarns 7 and 8.

A circumferential yarn 3 and an interlacing yarn 4 can be inserted into a corresponding shedding space prepared by separating one or two yarns from the other yarns in the axial yarns 1L, 1R, 2L and 2R such that every one or two yarns is spaced from the other yarn or such that every one or two yarns crosses the other yarns and is spaced from the other yarn.

Figure 4:
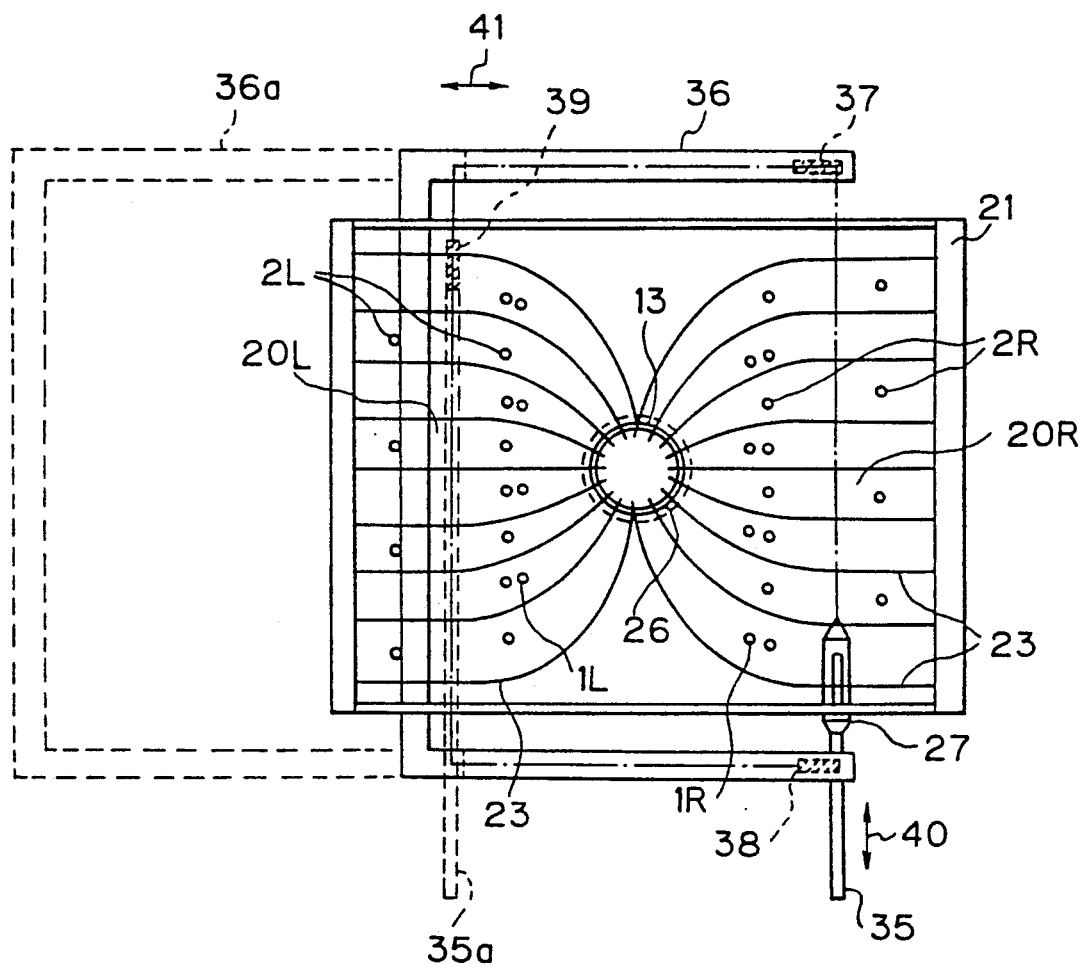
FIG. 4 is a plan view illustrating a reed and an arrangement in the reed of a plurality of yarns arranged in a direction parallel to an axis of the tubular multilayer woven fabric in accordance with the present invention, and a movement of a shuttle.

A reed 21, an arrangement of the axial yarns 1L, 1R, 2L and 2R in the reed 21, and a movement of a shuttle 27 are illustrated in FIG. 4. As shown in FIG. 4, each of the axial yarns 1L, 1R, 2L and 2R is arranged in shedding spaces 20L and 20R having a rectangular cross section, and in an enlarged state compared with a diameter of the tubular multifilament woven fabric to be manufactured, and thus each of the axial yarns 1L, 1R, 2L and 2R in the shedding space is aligned in a straight row.

The reed 21 can be reciprocally moved in a vertical direction in FIG. 3, and when the reed 21 is moved downward, the yarns 3, 4 or 5 to 8 are beaten on a cloth fell by the reed 21. The reed 21 has a special structure as shown in FIG. 4 Namely a plurality of dents 23 of the reed 21 are extended in a radial direction of the ring 13 from the ring 13 moving with the reed 21, curved inward towards each other and then extended in parallel to a frame of the reed 21. Thus when the reed 21 is raised from the cloth fell, the axial yarns 1L, 1R, 2L and 2R are guided to form two row arrangements between which the shedding space is formed, by the predetermined movements of the shedding devices 16 to 19, and when the reeds is lowered to the cloth fell, the yarn inserted into the shedding space is beaten on the cloth fell having a circular shape.

The yarns i.e., the circumferential yarn 3, the interlacing yarn 4 and the weft yarns 5 to 8 are inserted into the corresponding shedding space by a shuttle 27. A moving path of the shuttle 27 is illustrated by a chain dot line in FIG. 4. Namely, in the loom illustrated in FIG. 4, a metal plate (not shown) is fixed on an upper side and a lower side of the shuttle 27 in which a bobbin of the yarn to be inserted to the corresponding shedding space is mounted. A frame 36 having a C-like shape and movable reciprocally in a direction illustrated by a double-headed arrow 41 in FIG. 4, and a rapier 35 attached slidably to the frame 36 are used for applying the movement indicated by the above chain dot line to the shuttle 27. An electro-magnet 39 is provided on a top end of the rapier 35, and an electro-magnet 37 or 38 is provided on an under side of each end of the frame 36, respectively.

First, the top end of the rapier 35 is advanced below the shuttle 27 and then an electric current is supplied to the electro-magnet 39, and thus the shuttle 27 is held on the top end of the rapier 35 because the electro-magnet 39 is fixed on the lower side metal of the shuttle 27. Then the rapier 35 is advanced from the lower side to the upper side in FIG. 4 with the shuttle 27. At that time, the frame 36 is positioned as indicated by a solid line and the shuttle 27 is positioned below the electro-magnet 37 of the frame 36. Next, the electric current supplied to the electro-magnet 39 is cut off, and then an electric current is supplied to the electro-magnet 37 of the frame 36, and thus the shuttle 27 is held on the frame 36. Then the rapier 35 is moved back to its original position, and the frame 36 is moved from a right side to a left side in FIG. 4 and reached to a position indicated by a broken line as shown as 36a in FIG. 4, and thus the shuttle is moved to a left and upper position of FIG. 4. Since the rapier 35 is slidably attached to the frame, the rapier 35 is also moved from a position indicated by a solid line to a position 35a indicated by a broken line. Next the rapier 35 is moved from the lower side to the upper side, to transfer the shuttle 27 from the frame 36 to the rapier 35, and then the shuttle 27 is moved back to its original position by repeating the above-mentioned procedures. The yarn is arranged in a substantially rectangular shape around the ring 13. At that time, a length of the yarn arranged in the substantially rectangular shape is longer than that of a yarn to be arranged on the cloth fell 22 of the tubular multilayer woven fabric. To eliminate this problem, a yarn compensating device such as a spring may be used.

The movements of the shedding devices 16 to 19, the shuttle 27, the rapier 35 and the frame 36 can be successively controlled by a controller (not shown).

Various examples of the process of inserting the yarn will be described hereafter in connection with FIGS. 5 to 8.

Figure 5:
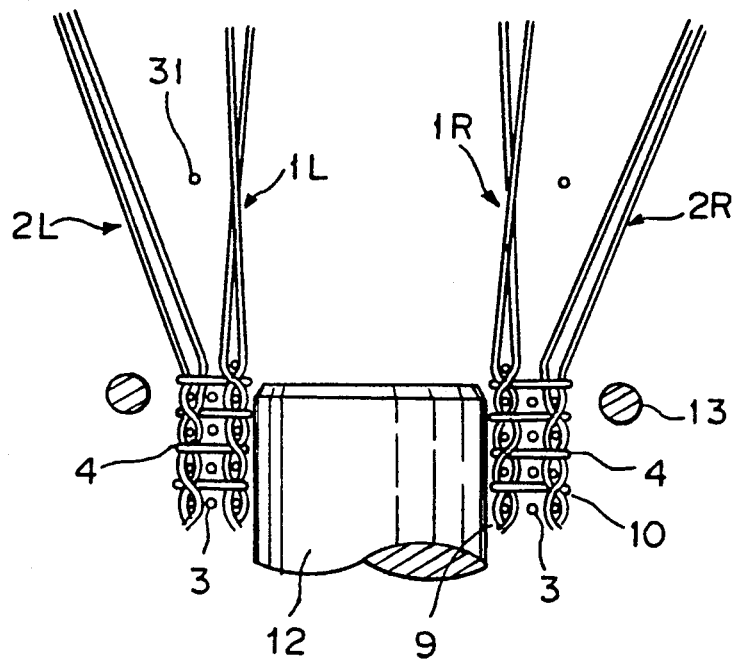
FIG. 5 is a schematic side view illustrating a process in which a circumferential yarn to be arranged between an inner layer and an outer layer of the tubular multilayer woven fabric having a weave illustrated in FIG. 1 is picked into a shedding space.

As shown in FIG. 5, when the yarn 31 is inserted into a shedding space prepared by separating the outer axial yarns 2L and 2R from the inner axial yarns 1L and 1R and beaten to the cloth fell 22 by the reed 21, and thus the yarn 31 becomes a circumferential yarn 3.

Figure 6:
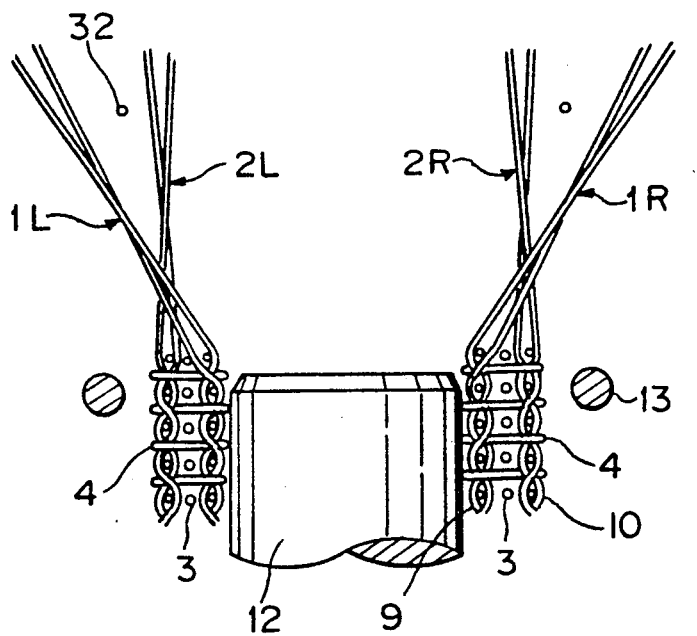
FIG. 6 is a schematic side view illustrating a process in which a yarn interlacing yarns in the inner layer with yarns in the outer layer of the tubular multilayer woven fabric having a weave illustrated in FIG. 1 is picked into a shedding space.

As shown in FIG. 6 when the yarn 32 is inserted into a shedding space prepared by crossing the inner axial yarns 1L and 1R with the outer axial yarns 2L and 2R, respectively, and then separating them from each other, and beaten to the cloth fell 22 by the reed 21, the yarn 32 becomes the interlacing yarn 4.

Figure 7:
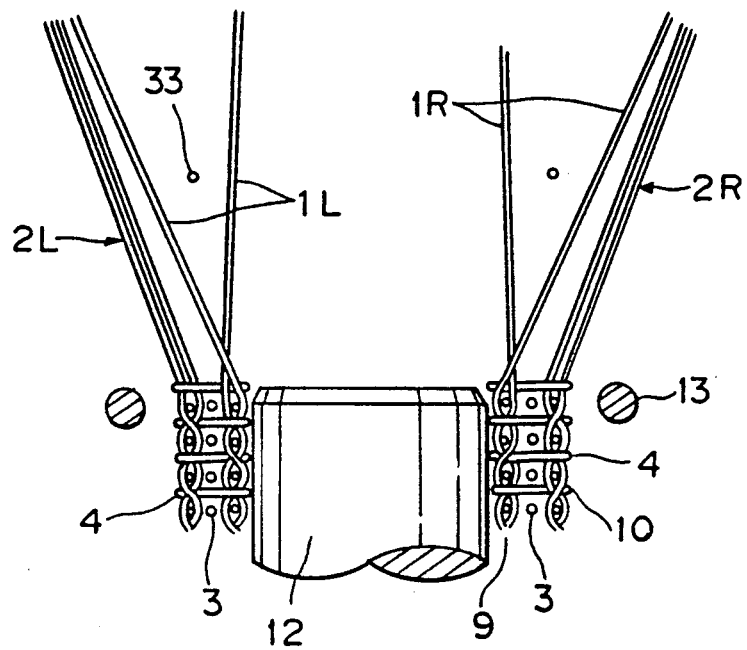
FIG. 7 is a schematic side view illustrating a process in which a weft yarn making a woven fabric with the yarns in the inner layer of the tubular multilayer woven fabric having a weave illustrated in FIG. 1 is picked into a shedding space.

As shown in FIG. 7, when the yarn 33 is inserted into a shedding space prepared by moving the outer axial yarns 2R and 2L to the outside, and separating the inner axial yarns 1R and 1L into two groups, respectively, and beaten to the cloth fell 22 by the reed 21, the yarn 33 becomes the weft yarns 5 or 6 for the inner layer 9 of a woven fabric.

Figure 8:
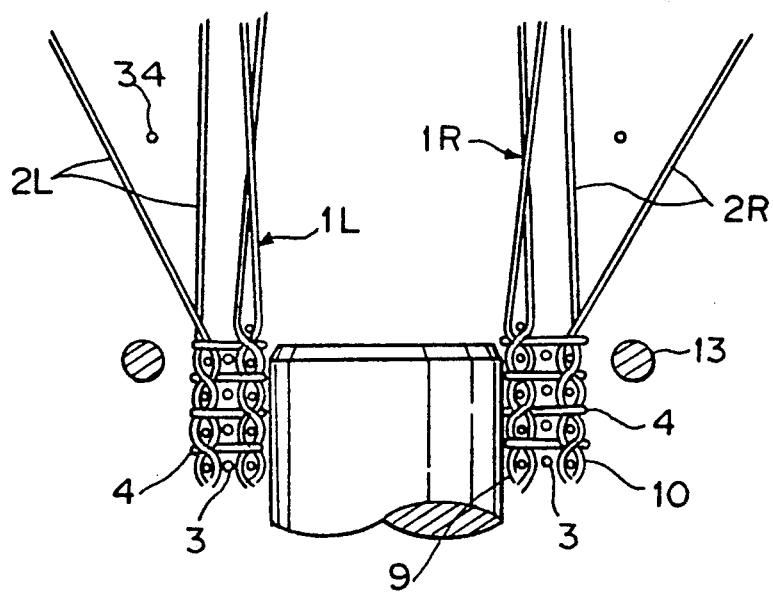
FIG. 8 is a schematic side view illustrating a process in which the weft yarn making a woven fabric with the yarns in the outer layer of the tubular multilayer woven fabric having a weave illustrated in FIG. 1 is picked into a shedding space.

As shown in FIG. 8, when the yarn 34 is inserted into a shedding space prepared by moving the inner axial yarns 1R and 1L to the outside, and separating the outer axial yarn 2R and 2L into two groups, respectively, and beaten to the cloth fell 22 by the reed 21, the yarn 34 becomes the weft yarns 7 and 8 for the outer layer 10 of a woven fabric.

As described before, the same yarn is used for the circumferential yarn 3, the interlacing yarn 4, and the weft yarns 5 to 8 in the tubular multilayer woven fabric described with reference to FIGS. 1 to 8, but if required, it is possible to use two or more yarns of a different thickness or material by using two or more shuttles. Further, it is possible to optionally determine a number of each yarn inserted into the shedding space per unit length, in an axial direction of the tubular multilayer woven fabric, by suitably controlling the operations of the shedding devices 10 to 19, while considering the strength in the axial direction, the strength in the circumferential direction and the strength against a partial stress, which are required in the tubular multilayer woven fabric to be manufactured.

Figure 9:
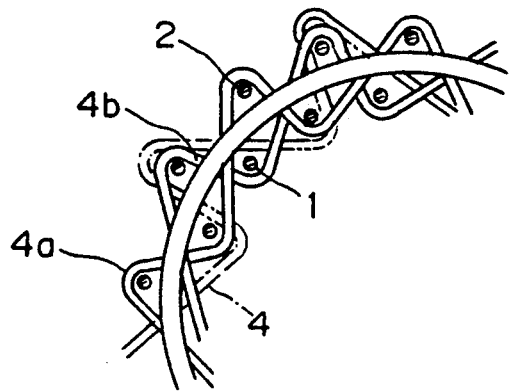
FIG. 9 is a partial cross sectional view of a third embodiment of the tubular multilayer woven fabric in accordance with the present invention.

A third embodiment of the tubular multilayer woven fabric in accordance with the present invention is shown in FIG. 9. In this embodiment, the weft yarns 5 to 8 are not used and the inner axial yarns 1 and outer axial yarns 2 are arranged in a zig-zag arrangement. An interlacing yarn 4 interlaces every two axial yarns of the outer axial yarns 2 or the inner axial yarns 1. The interlacing yarn 4 is constituted with a part 4b extending in a substantially circumferential direction and bearing a force in the circumferential direction and a part 4a interlacing the outer axial yarns 2 with the inner axial yarns 1 and thus the interlacing yarn 4 act both functions of an interlacing yarn 4 and weft yarns 5 to 8 in the first embodiment and the second embodiment.

Figure 10:
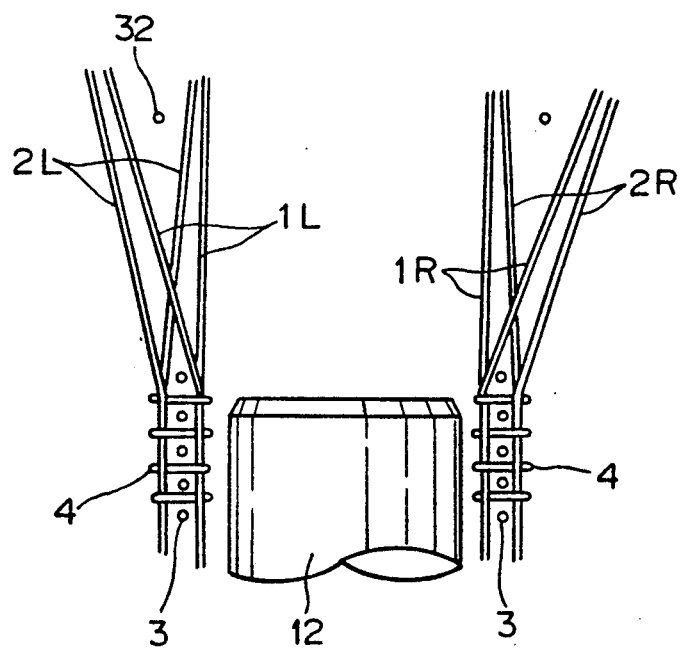
FIG. 10 is a schematic side view illustrating a state in which a yarn in the tubular multilayer woven fabric having a weave illustrated in FIG. 9.

The third embodiment of the tubular multilayer woven fabric can be manufactured by an inserting operation of the circumferential yarn 3 described with reference to FIG. 5 and an inserting operation of the interlacing yarn 4 described with reference to FIG. 10. As shown in FIG. 10, when the interlacing yarn 4 in the third embodiment is inserted in a shedding space, the shedding space is prepared by separating every two yarns of the inner axial yarns 1R and 1L, and the outer axial yarns 2R and 2L, and this arrangement of the shedding space is different from that shown in FIG. 6. Note this arrangement of the shedding space can be used when inserting an interlacing yarn 4 in the tubular multilayer woven fabric shown in FIG. 2.

The circumferential force applied to the tubular multilayer woven fabric shown in FIG. 9 is almost all supplied by the circumferential yarn 3. Accordingly, this woven fabric can be used only as a reinforcing body for a pipe to which a relatively simple inner pressure and outer pressure is applied.

In accordance with the present invention, it is possible to apply a sufficient strength in the axial direction and the circumferential direction of the tubular woven fabric to a tubular multilayer woven fabric, while considering properties required in a composite body, e.g., a pipe manufactured with the tubular multilayer woven fabric. Further, the circumferential yarn extends in substantially straight line without being interlaced with other yarns, and accordingly, it is possible to provide the tubular multilayer woven fabric having a thin thickness and sufficient strength, and thus a process of making the composite body is facilitated.

We claim:

1. A tubular multilayer woven fabric composed of at least two adjacent layers comprised of a plurality of yarns arranged in a substantially circular shape along a direction parallel to an axis of the tubular multilayer woven fabric, respectively, each layer of the at least two adjacent layers being arranged from an inside to an outside of the tubular multilayer woven fabric; a circumferential yarn arranged in a non-interlaced manner between the two adjacent layers and extending spirally in a circumferential direction of the tubular multilayer woven fabric, and at least one yarn extending spirally in the circumferentially direction of the tubular multilayer woven fabric and interlacing the yarns constituting one of the adjacent layers with the yarns constituting the other of the adjacent layers.

2. A tubular multilayer woven fabric according to claim 1, wherein said at least one of said at least two adjacent layers is a woven fabric formed by arranging two weft yarns interlaced with each yarn constituting the individual layer.

3. A tubular multilayer woven fabric according to claim 1, wherein a number of layers constituted with the yarns arranged in the direction parallel to the axis of the tubular multilayer woven fabric is two.

4. A tubular multilayer woven fabric according to claim 1, wherein a number of layers constituted with the yarns arranged in the direction parallel to the axis of the tubular multilayer woven fabric is three.

5. A tubular multilayer woven fabric according to claim 1, wherein a number of yarns interlacing the yarns constituting the one layer with the yarns constituting the another layer is one.

6. A tubular multilayer woven fabric according to claim 1 wherein the number of yarns interlacing the yarns arranged in the substantially circular shape along the direction parallel to the axis of the tubular multilayer fabric in the one layer with the yarns arranged in the substantially circular shape along the direction parallel to the axis of the tubular multilayer fabric in the other layer is two, and the two interlacing yarns interlace with the yarns arranged in the substantially circular shape along the direction parallel to the axis of the tubular multilayer fabric in the same layer, alternately.

7. A method for manufacturing a tubular multilayer woven fabric, wherein said method comprises the following steps:
 a) a step of supplying at least first and second layers comprising a plurality of yarns along a circumferential surface of a core member having a circular cross sectional shape so that each layer is coaxially arranged,
 b) a step of separating the yarns of the first layer from the yarns of the second layer to form a first shedding space,
 c) a step of picking a yarn into the first shedding space made by the step (b),
 d) a step of separating at least a part of the yarns in one of said first and second layers from the remaining yarns including at least one yarn in the other of said first and second layers to form a second shedding space,
 e) a step of picking a yarn into the second shedding space made by the step (d), and
 f) repeating the steps from step (b) to step (f) until a tubular multilayer woven fabric having a predetermined length is obtained.

8. A method according to claim 7, wherein the step (d) and the step (e) are applied twice in a state such that a relative arrangement of the yarns arranged on one side of the shedding space and the yarns arranged on another side of the shedding space are mutually reversed, after the step (c).

9. A method according to claim 7, wherein said method further include a step (g) of separating the yarns of one layer from the remaining yarns of the same layer to form a third shedding space, and including a step (h) of picking a weft yarn into the third shedding space, the step (g) and the step (h) being applied twice in a state such that a relative arrangement of the yarns in the same layer are mutually reversed.

10. A method according to claim 7, wherein the picking step is performed by a shuttle including the yarn to be picked, and the shuttle is moved from an original position along a first straight line, traversed in a direction perpendicular to the first straight line, moved back along a second straight line parallel to the first line and traversed in a direction perpendicular to the second straight line to be positioned in the original position; and the above four steps are repeated.

* * * * *